US006894902B2

(12) United States Patent
Chang

(10) Patent No.: US 6,894,902 B2
(45) Date of Patent: May 17, 2005

(54) COMPUTER EXPANSION DEVICE WITH USB INTERFACE

(76) Inventor: Cheng Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 182 days.

(21) Appl. No.: 10/420,500

(22) Filed: Apr. 22, 2003

(65) Prior Publication Data

US 2004/0148449 A1 Jul. 29, 2004

(30) Foreign Application Priority Data

Jan. 29, 2003 (TW) ....................................... 92201685 U

(51) Int. Cl.⁷ ................................................. H05K 7/20
(52) U.S. Cl. ....................... 361/715; 361/788; 361/686; 361/789; 439/502
(58) Field of Search ................................ 361/752, 797, 361/788, 826, 800, 796, 683, 686, 803, 785, 789; 439/502

(56) References Cited

U.S. PATENT DOCUMENTS 5,963,431 A * 10/1999 Stancil ........................ 361/803
6,261,104 B1 * 7/2001 Leman ........................ 439/61

* cited by examiner

Primary Examiner—Kamand Cuneo
Assistant Examiner—Hung S. Bui
(74) Attorney, Agent, or Firm—Quintero Law Office

(57) ABSTRACT

The present invention discloses a computer expansion device with a universal serial bus (USB) interface, comprising: a housing having an installation space; a circuit board, disposed in the housing and having a USB port and a power supply terminal; the USB port electrically coupled to a first USB interface signal IC by a circuit, and such IC being electrically coupled to three first connecting ends by circuits, and electrically coupled to a second USB interface signal IC by another circuit, and such IC being electrically coupled to four second connecting ends; wherein the three first connecting ends and a second connecting end selectively coupled to a peripheral device with a USB interface conversion function by an electric connection such that the USB interface signals are transmitted, and the rest of the three second connecting ends are respectively coupled to a USB interface socket.

4 Claims, 3 Drawing Sheets

COMPUTER EXPANSION DEVICE WITH USB INTERFACE

BACKGROUND OF THE INVENTION

1. Field of the Invention

The present invention relates to a computer expansion device with a universal serial bus (USB) interface, more particularly to an expansion device having computer peripheral devices coupled to a USB interface signal Input/Output to meet the expansion requirements of portable computer.

2. Description of the Related Art

The development of computer tends to be compact in its design; the notebook computer among the portable computers is a good example. Since the integrity of computer functions is taken into consideration, therefore the optical disk drive, hard disk drive, floppy disk drive, and battery are indispensable peripheral devices. As to the actual computer operation, users generally install the operating system and application programs in a hard disk drive for their actual applications, and the notebook computer is usually used in the office or at home. Therefore, some computer manufacturers broke through the long existing hardware architecture of the notebook computer and developed a so-called "Desknote" computer. Such desknote computer removes some of the peripheral devices from the computer and definitely greatly reduces the weight and thickness of the computer. Therefore, the future computer system architecture only includes a motherboard, a hard disk drive and a housing, and the rest of peripheral devices will be connected to a computer externally.

If the aforementioned peripheral devices are connected to a computer with different ways and since the motherboard cannot provide so many ports, therefore repeatedly plugging and unplugging the devices will trouble the users very much. No doubt, notebook computers may use a docking station to connect different peripheral devices, but the pin assignment of the connector is custom-made with a specific specification depending on the port available on the notebook computer, which usually cannot fit all of the requirements and that is what users have been complaining the most. Therefore, using a common computer interface for sufficiently connecting the peripheral devices is an issue that manufacturers have to overcome.

SUMMARY OF THE INVENTION

The primary objective of the present invention is to provide a computer expansion device with a USB interface, comprising an installation space in a casing for accommodating and positioning the desired devices; a circuit board, disposed in the housing and having a USB port and a power supply terminal, so that the computer can be connected by USB signal cables and receive external power supply; the USB port electrically coupled to a first USB interface signal IC by a circuit to have the functions of a hub, and such IC is electrically coupled to three connecting ends by circuits to connect the peripheral devices with cables and such IC is electrically coupled to a second USB interface signal IC by another circuit, and such IC being electrically coupled to four second connecting ends; wherein the three first connecting ends and a second connecting end selectively coupled a peripheral device with USB interface conversion function by electric connection such that the USB interface signals are transmitted, and the rest of the three second connecting end are respectively coupled to a USB interface socket. The present invention only uses one signal line for the connection to concurrently have the expansion function and the hub function, which can be regarded as one of the greatest ideas.

In view of the above description, the inventor of the present invention based on years of experience accumulated from the engagement in the computer peripheral related industry and conducted extensive research to break through the inconvenience of externally connecting the computer peripheral one by one and resolve the aforementioned shortcomings by adopting the USB interface with the function of a hub for the signal connection and invented the computer expansion device with USB interface in accordance with the present invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
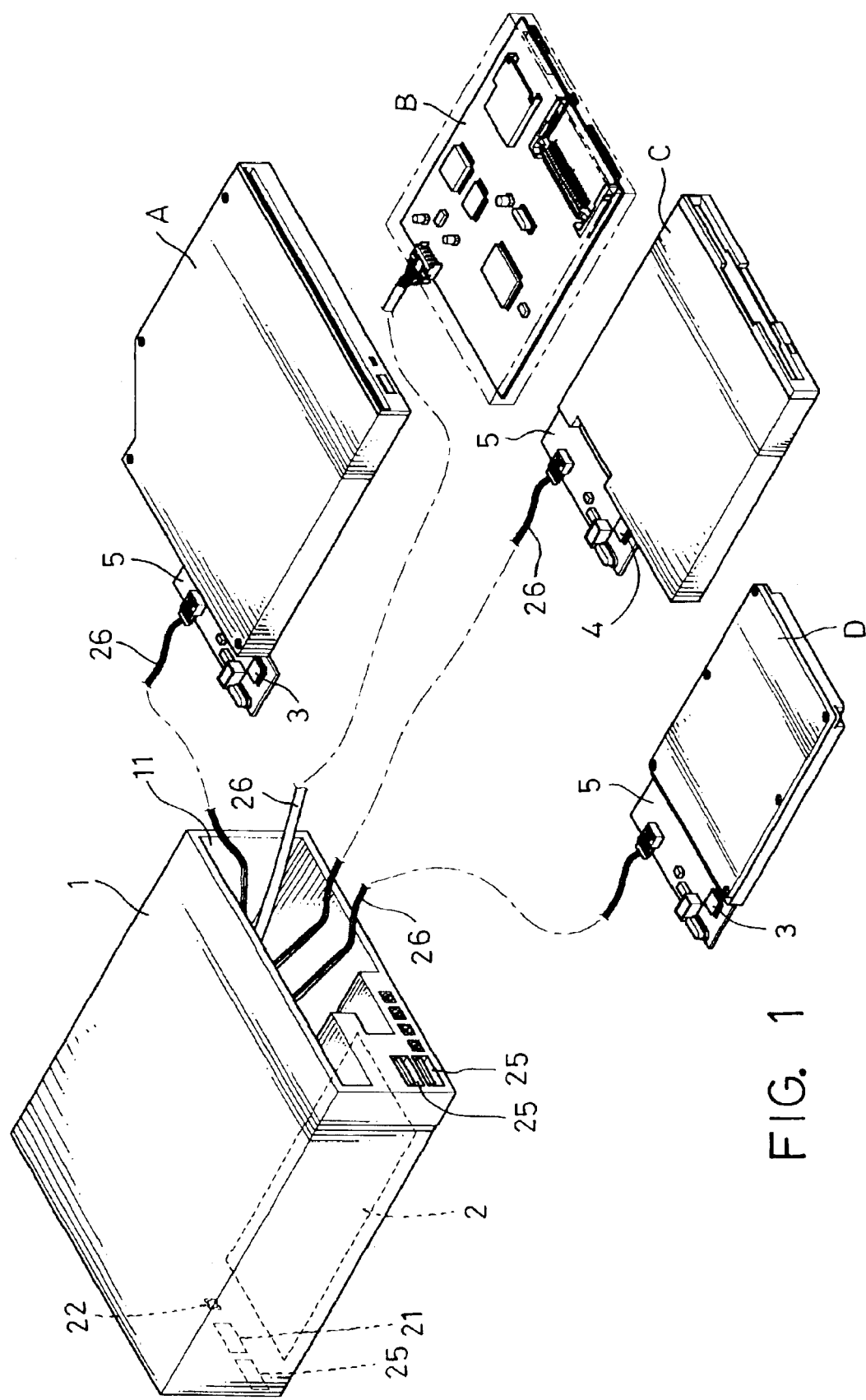
FIG. 1 is a perspective diagram of the disassembled parts of the computer expansion device according to the present invention.
Figure 2:
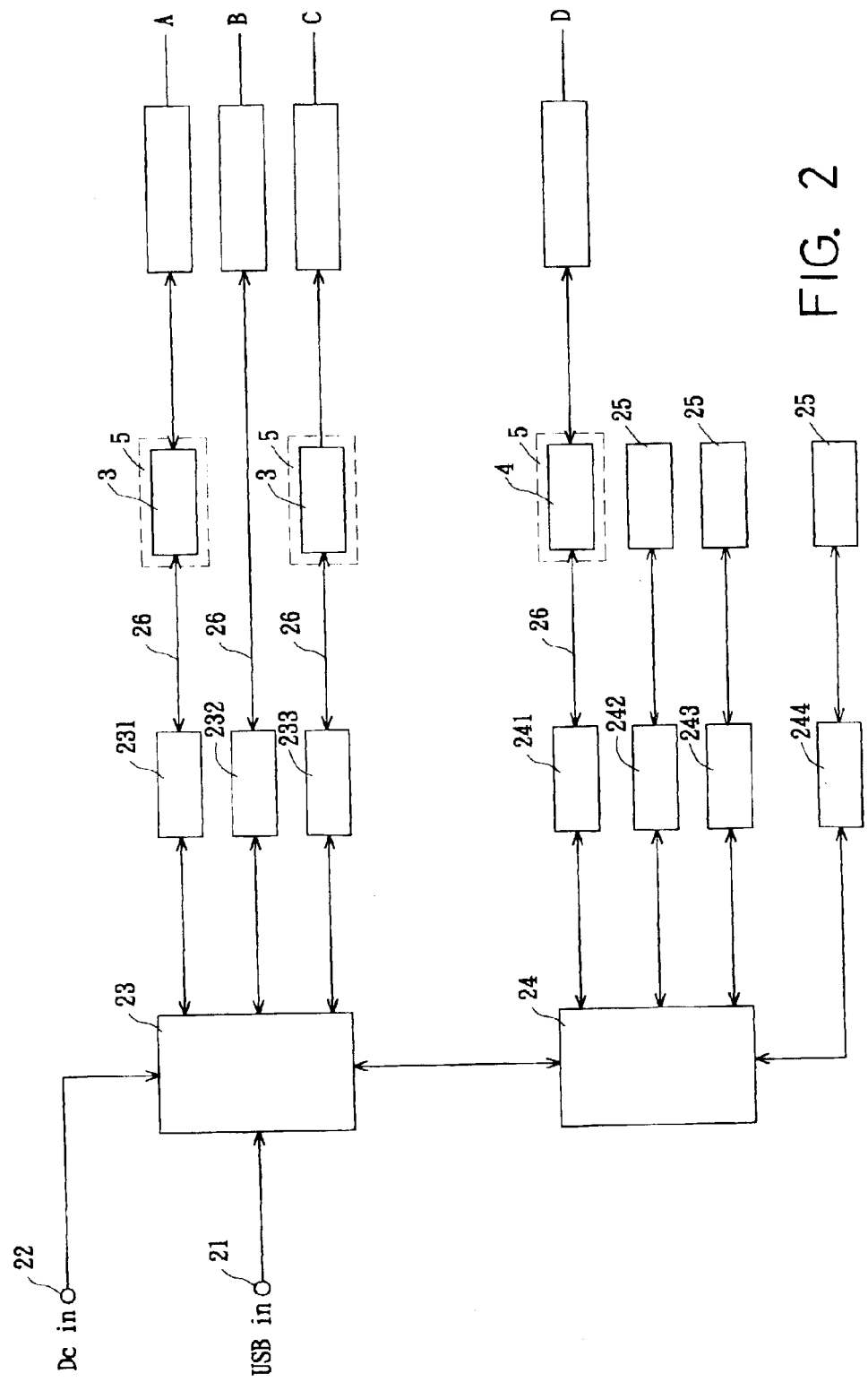
FIG. 2 is a block diagram of the circuit board according to the present invention.
Figure 3:
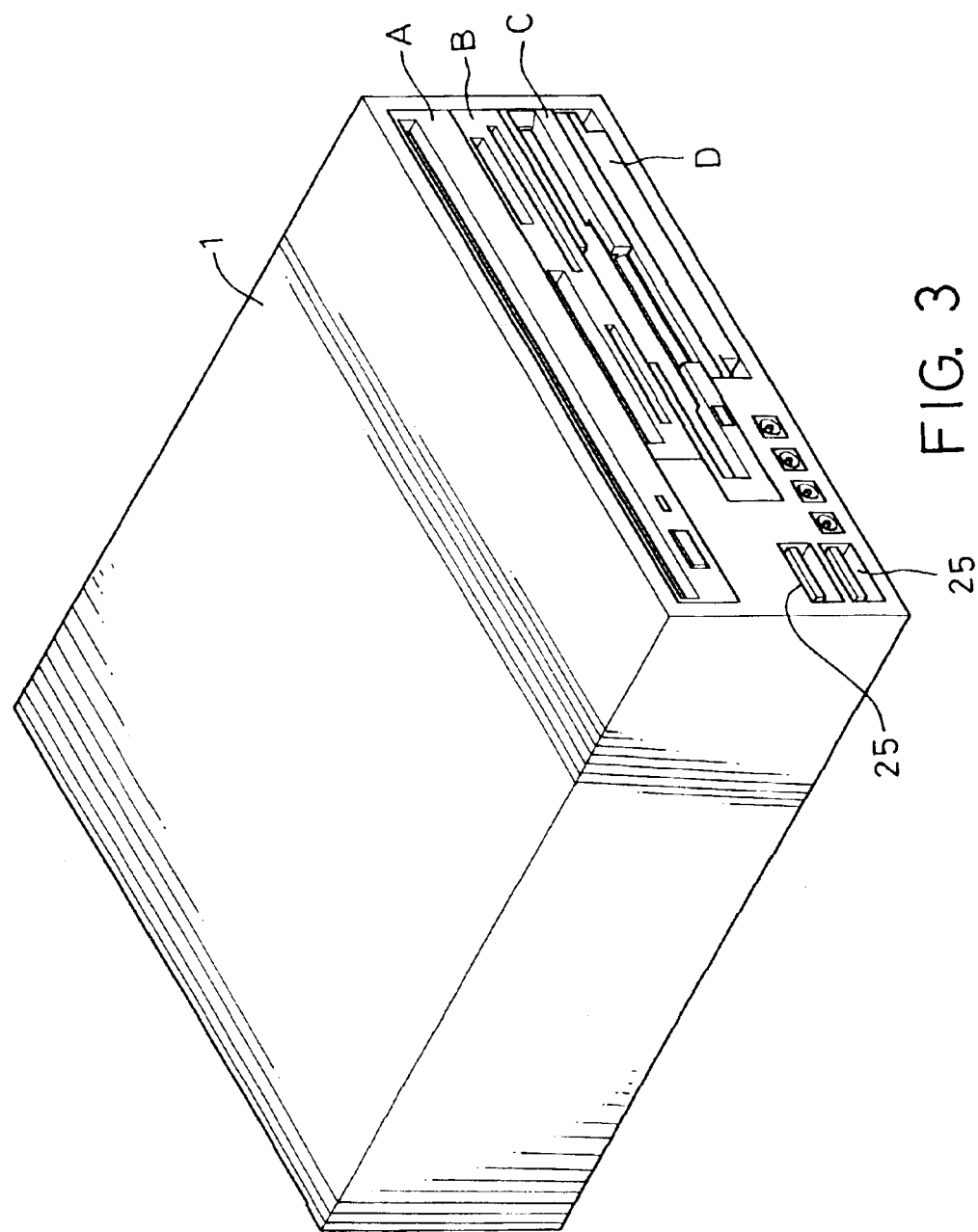
FIG. 3 is a perspective diagram of the assembled computer expansion device according to the present invention.

Please refer to the FIGS. 1 through 3, basically, the computer expansion device according to the present invention comprises a housing 1 and a circuit board 2.

Wherein the housing 1 has an installation space 11 for installing peripheral devices such as the accommodation and positioning of an optical disk drive A, a card reader B, a floppy disk drive C, and a hard disk drive D; a plurality of holes and slots disposed on the external surface of the housing 1 for exposing a USB port 21, a power supply input terminal 22, or at least one USB interface socket 25 and facilitating their connection. However, all these are prior arts and will not be described here.

The circuit board 2 comprises a USB 21 and a power supply terminal 22 for connecting the USB signal cable to the computer and obtaining the power supply for the operation of the foregoing peripheral devices respectively. The USB port 21 is electrically coupled to a first USB interface signal IC 23 (including but not limited to an IC with model number GL650USB) by a circuit, and three first connecting ends 231, 232, 233 are electrically coupled by a circuit such as a 5-pin USB connector adopting similar to the prior art hub that has at least 3 plug-and-play USB interfaces. The first USB interface signal IC 23 uses another circuit to electrically couple a second USB interface signal IC 24, and such second IC 24 uses a circuit to electrically couple four connecting ends 241, 242, 243, 244, wherein the first second connecting end 241 is coupled to a 5-pin USB connector, and the other three connecting ends 242, 243, 244 each couples to a USB interface socket 25. When the USB interface sockets 25 are used as shown in the figure, two pins are disposed in the front side of the housing 1 and one pin at the back side of the housing 1 to facilitate the installation of the peripheral devices such as the connection of a digital camera, a digital projector, a printer, a scanner, or a joystick.

Each connecting end 231, 232, 233 and 241 is connected by a USB cable 26 respectively to the peripheral devices having the USB interface signal conversion function such as the optical disk drive A and the hard disk drive D adopting the IDE-USB signal converter 3, the floppy disk drive C adopting the FDD-USB signal converter 4, and the card reader using the built-in memory card controller to convert its signals into USB interface signal and connected to the connecting end 232. Since the aforementioned interface conversion is a prior art, therefore they will not be described here.

The signal converters 3, 4 are built in the circuit board 2; for example, each connecting end 231, 233, 241 is connected to its corresponding signal converter 3, 4, and can connect to different peripheral devices with the IDE interface socket and FDD interface socket, etc to obtain the expected functions. However, as to the production by manufacturers, the entire circuit board will be disabled or become a defective product if the signal converter is incorrectly soldered onto the circuit board. Therefore, the inventor of this invention proposes a solution by installing the signal converters 3, 4 on a second circuit board 5 integrated to the corresponding peripheral device, such that the peripheral device itself has the interface signal conversion function. The modularization of such signal converter into a small sized second circuit board 5 can improve the yield rate of the circuit board 2.

Therefore, in the present invention, the hub function of the USB interface signal and the design of the modularization of the signal converter are used such that the necessary peripheral devices for the notebook computer can be connected to the computer by a single externally connected USB signal cable. Although such arrangement occupies one USB port of the computer system, it gives three extra USB interface sockets, and a further expansion function. Furthermore, if the signal converter adopts the design of installing on a second circuit board, it can greatly reduce the defective rate. The present invention is definitely a great idea for the computer expansion device.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer expansion device with USB interface, comprising:

a housing, having an installation space;

a circuit board, disposed in said housing and having a USB port and a power supply terminal, and said USB port electrically coupled to a first USB interface signal IC by a circuit, and said IC being electrically coupled by a circuit to three first connecting ends respectively, and electrically coupled by another circuit to a second USB interface signal IC, and said second USB interface signal IC being electrically coupled to four second connecting ends; wherein the three first connecting ends and a second connecting end being selectively coupled to a peripheral device with a USB interface conversion function by an electric connection such that said USB interface signals being transmitted, and the rest of the three second connecting ends each being coupled to a USB interface socket.

2. The computer expansion device with USB interface of claim 1, wherein said peripheral device refers to one selected from the collection of a hard disk drive, a floppy disk drive, a card reader, and an optical disk drive.

3. The computer expansion device with USB interface of claim 1, wherein said each first connecting end and said second connecting end of the circuit board are electrically coupled by a circuit to an interface signal converter, such that the interface corresponding to said peripheral device being converted into a USB interface signal, and the interface corresponding to each peripheral device on said circuit board being electrically coupled the corresponding socket for connecting said peripheral device with a cable.

4. The computer expansion device with USB interface of claim 1, wherein said interface signal converter is disposed on a second circuit board, modularized, and coupled to the corresponding peripheral device, and each first connecting end and a second connecting end being connected to a modularized circuit board by a cable.

* * * * *